United States Patent Office 3,046,222
Patented July 24, 1962

3,046,222
LOW FLUID LOSS FRACTURING COMPOSITION
Achyut K. Phansalkar, Ponca City, Okla., Albert H. Roebuck, Midland, Tex., and James B. Scott, Ponca City, Okla., assignors to Continental Oil Company, Ponca City, Okla., a corporation of Delaware
No Drawing. Filed July 28, 1958, Ser. No. 751,125
30 Claims. (Cl. 252—8.55)

This invention relates generally to improvements in the art of fracturing oil and gas wells, and more particularly, but not by way of limitation, to an improved well-working composition having a low fluid loss and the process of making and using such composition.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The extent of the fracture obtained is dependent primarily upon the penetrating characteristics of the fracturing fluid. Therefore, a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. A widely accepted fracturing fluid is disclosed in U.S. Patent 2,779,735, issued to Jack L. Brown and Mary M. Landers on January 29, 1957. This patent teaches the concept of using a finely divided oil-insoluble material having a substantial portion of its particles below 2 microns in size, and an agglutinant dispersant in an oil carrier to form a fracturing fluid. The agglutinant has only such strength as is necessary to cooperate with the small particles of the oil insoluble, finely divided material to form a substantially fluid impervious seal on the face of a formation. Such a composition is very effective in fluid loss control, and the solids and agglutinants are used in quantities which are extremely small compared with the materials required by prior teachings in the art. However, the availability of any substantial amount of solid particles below 2 microns is limited, and the composition is usually prepared by a special spray or drum drying operation to obtain the desired particle sizes.

The present invention contemplates a novel well-working composition utilizing a minor amount of a soft and pliable sealing or plugging agent which is effective in providing a seal on the face of a formation with a minor amount of substantially larger particles than contemplated in the above-mentioned patent. More specifically, the present invention contemplates the combination of at least temporarily oil-insoluble solids and a secondary plugging agent in an oil carrier, wherein it is only necessary that the solid contain particles of about 2 to about 10 microns in size, and the second plugging agent cooperates with such solid particles to form an effective seal. The use of such larger particles greatly increases the sources of supply of the oil-insoluble solid material and facilitates dry blending of a fracturing fluid additive without the necessity of specially preparing the various components. A large variety of the strong secondary plugging agents may be used, and they are also normally readily available and economical. A well-working composition prepared in accordance with this invention has a relatively low viscosity which may be easily increased if the user so desires.

An important object of this invention is to provide an economical well-working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well-working operations.

Another specific object of this invention is to provide a low fluid loss composition comprising an oil carrier and only a minor amount of additive for reducing the fluid loss properties of the composition.

A still further object of this invention is to provide an additive for a fracturing fluid which may be dry blended without specially preparing any of the components of the additive.

Other objects and advantages of the invention will be evident as the description proceeds.

Stated broadly, the present invention may be defined as a process of fracturing a well wherein a petroleum oil is forced into the well bore under pressure, the improved method of sealing sub-surface formations traversed by the well bore against loss of appreciable amounts of the said oil to the formations, which comprises incorporating in said oil an additive containing a sufficient amount of finely divided oil-insoluble solid particles less than 10 microns in size, such as from about 2 to about 10 microns in size, and a sufficient amount of a secondary plugging agent to reduce the fluid loss of the resulting composition to less than 50 cc. in 30 minutes when tested at 125° F. and a pressure differential of 1,000 p.s.i.g. according to the recommended API test for fracturing fluids using additives, and contacting the faces of sub-surface formations exposed to the well bore with said oil having said additive incorporated therein.

Before proceeding with specific examples illustrating our invention, it may be well to indicate in general the nature of the materials required.

PETROLEUM OIL

The petroleum oil which may be used as the carrier or vehicle in our improved fracturing fluid may be substantially any petroleum hydrocarbon liquid. For example, we may use crude oil which is normally available in the vicinity of the well-working operation. Such crude oils range in viscosity from 5 to 100 centipoises, but usually between 15 to 25 centipoises taken at a temperature of 70° F. In addition, refined petroleum products may be used, such as kerosense, pale oil, diesel fuel, fuel oil, etc.

PRIMARY PLUGGING AGENT

In general, any finely divided solid which will not go into solution to any appreciable extent in an oil during a period of time necessary for fracturing a well may be used in the composition of this invention. In this sense, the solid material may be considered oil insoluble. For example, we may use a material, such as gilsonite, which remains in a solid form in a petroleum oil for an appreciable period but which would substantially dissolve in the oil if left in the oil for an extended period and which would, therefore, chemically speaking, be considered oil soluble. It should also be noted that we may use materials which are presently used as weighting materials in oil base drilling muds, such as oyster shell flour, barium sulfate, crushed limestone, or lime, providing such materials have the required particle size, as will be described below. We may also, for example, use calicium carbonate, calcium chloride, calcium sulfate, carbon black, carboxy methyl cellulose, fuller's earth, and similar products, magnesium sulfate, mica, Portland cement, sodium borate, sodium carbonate, sodium chloride, sodium silicate, sodium sulfate, spent catalyst, coal dust, asphalts, and walnut shells.

SECONDARY PLUGGING AGENT

A great variety of secondary plugging agents may be used in the composition of this invention. As used herein and in the appended claims, the term "secondary plugging agent" may be defined as a partially oil-insoluble material which, when dispersed in oil, is soft and pliable and is either of such molecular or physical structure that portions of the molecules or particles will intermesh with portions of other similar molecules or particles to form a continuous film, or of such physical structure to deform into and seal the interstices between a layer of oil-insoluble solid particles of about 10 microns. For example, we may use waxes such as montan wax obtained from lignitic coal or peats, asbestos, plastic fines such as polyvinyl and methacrylate fines, cellulose and rubber fines, as well as certain metal soaps. An asbestos which has been found effective is sold by Johns-Manville Company under the designation 7FR1, and a rubber product which has been found effective is sold by the Chemical Division of Goodyear Tire and Rubber Company under the trade name of Pliolite NR (unmilled). The metal soaps which may be used are made from fatty acids having at least 14 carbon atoms and preferably 16 to 22 carbon atoms, such as the acids in tall oil. Also, the metal cations of the soaps must be either di or tri valent, or a mixture of mono and di or tri valent ions. For example, we may use aluminum soaps such as aluminum oleate and aluminum tallate; calcium soaps such as calcium tallate, or a combination of sodium tallate and calcium tallate.

When a metal soap is used as the secondary plugging agent, a portion of the soap may go into solution in the oil and function as a dispersing agent to hold the primary and secondary plugging agents in suspension in the oil carrier.

DISPERSING AGENT

As previously noted, the present additive may be used in a great variety of petroleum oils. In some of these oils, and particularly some crude oils, the primary and secondary plugging agents will remain suspended in the oil during the fracturing operation without the use of a separate dispersing agent. Also, when a metal soap is used as the secondary plugging agent, it may function partially as a dispersing agent, as noted above; and a separate dispersing agent is not required. However, when a separate dispersing agent is required, a variety of oil-soluble surface active agents may be used. The sulfonates, sulfates, phenolic compounds, organic phosphorus compounds, and phosphorus sulfide treated olefins are typical surface active agents.

Sulfonates

Sulfonates which are suitable are oil-soluble and include the alkali metal and alkaline earth metal soaps of alkyl sulfonic acid, alkaryl sulfonic acid, and the so-called mahogany or petroleum sulfonic acids, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include non-aromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 350 and 1,000. Preferably this molecular weight is between 400 and 700. Particularly useful sulfonates include the alkali and alkaline earth diwaxbenzene sulfonates, diwaxtoluene sulfonates, and polydodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dilauryl betanaphthol sulfonates, dicapryl nitro-naphthalene sulfonates, unsaturated paraffin wax sulfonates, hydroxy substituted paraffin wax sulfonates, tetra-amylene sulfonates, mono- and poly-chloro-substituted paraffin wax sulfonates, nitrosoparaffin wax sulfonates; cycloaliphatic sulfonates such as lauryl-cyclohexyl sulfonates, mono- and poly-wax substituted cyclohexyl sulfonates, and the like. The expression "petroleum sulfonate" is intended to cover all sulfonates derived from petroleum products.

A suitable oil-soluble sulfonate is the product produced by neutralizing postdodecylbenzene overhead sulfonic acid with sodium hydroxide or other base. PDB overhead sulfonic acid is the acid produced by sulfonating

PDB—OH

Physical properties of PDB—OH before sulfonating are as follows:

| | |
|---|---|
| Specific gravity at 48° C | 0.866 |
| Average molecular weight | 300 |
| A.S.T.M. (D–158 Engler), ° F.: | |
| I.B.P. | 647 |
| 5 | 625 |
| 10 | 630 |
| 50 | 656 |
| 90 | 710 |
| 95 | 730 |
| F.B.P. | 738 |
| Refractive index | 1.4902 |
| Viscosity at 100° F., SUS | 110 |
| Bromine number | .40 |

Phenolic Compounds

The phenolic organic compounds which may be used are the free oil-soluble phenolic compounds or the metal phenates thereof. Oil-solubility is imparted to such phenolic compounds by the presence in the molecule of at least nine aliphatic carbon atoms. Specific examples are: 3,5,5-trimethyl-n-hexyl phenol, n-decyl phenols, cetyl phenols, nonyl phenols, and the like; alkaryl substituted phenols such as alkyl-phenyl phenols; polyhydroxy alkyl-aromatic compounds such as 20-carbon alkyl resorcinol, or polyhydroxy alkyl-benzenes, such as, for example, octyl catechol, tri-iso-butyl pyrogallol, and the like; mono-hydroxy alkyl-naphthalenes such as 12-carbon alkyl alpha naphthol, and the like. Alkyl substituted phenol sulfides containing at least 5-alkyl carbon atoms such as iso amyl or nonyl phenol disulfide and the like may be used.

*Organic Phosphorus Compounds*

Useful organic phosphorus compounds include tri- and penta-valent organic phosphorus acids and the corresponding thiophosphorus acids and their oil-soluble salts, as, for example, phosphoric acids and thiophosphoric acids, phosphinic acids and thiophosphinic acids, and the like and the oil-soluble salts thereof. The organic radicals substituted may be aliphatic, cycloaliphatic, aromatic, substituted aromatic, and the like and preferably contain a total of at least about 12 carbon atoms. Suitable phosphoric acid compounds include, for example, monowax phosphorus acids, mono-octadecyl phosphorus acid, mono-dodecyl phosphorus acid, methyl cyclohexyl phosphite, capryl phosphite, dicapryl phosphite, zinc monowaxbenzene phosphonate, zinc dodecylbenzene phosphonate, and the like. Useful organic thiophosphorus acids include dicapryl dithiophosphoric acids, dilauryl dithiophosphoirc acids, di-(methyl cyclohexyl) dithiophosphorus acids, lauryl monothiophosphoric acids, diphenyl dithiophosphoric acids, ditolyl monothiophosphoric acids, di-(iso-propyl-phenyl) monothiophosphoric acids, and the like, and the oil-soluble salts thereof.

*Phosphorus Sulfide Treated Olefins*

The phosphorus sulfide treated olefins and their oil-soluble metal salts which are suitable for use include those customarily used in lubricating oil formulations as corrosion inhibitors and/or detergents. Specifically, they include the potassium-polyisobutylenephosphorus sulfide products described by U.S. Patent 2,316,080, issued on April 6, 1943, to Loane and Gaynor, and a similar material containing no metal made by addition of a phosphorus sulfide to wax olefins as described in U.S. Patent 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

*Other Oil-Soluble Surface Active Agents*

Examples of other surface active agents which may be used include: a substituted oxazoline, obtainable from Commercial Solvents Corporation under the trade name "Alkaterge C, O, and OX"; heterocyclic tertiary amine

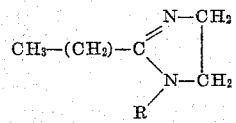

obtainable from Alrose Chemical Company under the trade name "Alro amines Ci, O, and S"; a secondary fatty acid amine, obtainable from Armour and Company under the trade name "Armeen 2C and 2HT"; quaternary ammonium compounds of the formula

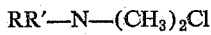

RR'—N—(CH$_3$)$_2$Cl obtainable from Armour and Company under the trade name "Arquad 2C and 2HT"; and a modified cationic agent, obtainable from Alrose Chemical Company under the trade name "Detergent I-160."

One of the important considerations in the preparation of a fracturing fluid in accordance with this invention is the particle size of the primary plugging agent. We have found that when a strong secondary plugging agent, as defined above, is used, a minor portion of particles below 10 microns are required. More specifically, we have found that when a composition is prepared using about 0.0004 pound of the solid variety in size below 10 microns, such as between 2 and 10 microns, an effective fluid-loss control is obtained. It will be understood, however, that all of the particles of the primary plugging agent need not be below 10 microns in size; and, in fact, we prefer a finely divided solid also having an appreciable portion of larger particles, since such solids are more easily obtained. As to the total primary plugging agent, we prefer to use between 0.0004 and 0.2 pound per gallon of oil, depending somewhat upon the inherent fluid loss properties of the oil. This amount of primary plugging agent provides an economical composition having good fluid-loss properties, and the viscosity of the composition is not unduly high. The use of more than 0.2 pound of the primary plugging agent per gallon of oil does not appreciably decrease the fluid loss of the composition and merely increases the cost of the composition.

The following examples (Table I) illustrate the particle size distribution of readily available solids which may be used as a primary plugging agent in a composition of this invention and the effectiveness of the solids when used in combination with one of the present strong secondary plugging agents. The particle sizes were obtained using Stokes' law, as is well known in the art; and the fluid loss of each composition was obtained by adding 0.05 pound of the respective solid per gallon of oil and 0.05 pound of aluminum oleate per gallon of oil to kerosene and mixing the composition for 3 minutes on a Waring Blendor at full speed. The mixed composition was placed in a filter cell and allowed to stand for 10 minutes to reach the desired temperature of 125° F. The cell was then inverted and connected to a pressure reservoir having a pressure of 1,000 p.s.i.g., in accordance with a recent procedure recommended by an API committee for testing fracturing fluids using additives, which test has been widely accepted in the oil industry. Fluid loss is measured in cubic centimeters per 30 minutes.

TABLE I

[Percentage of particles below]

| Solid | 50 Microns | 30 Microns | 20 Microns | 10 Microns | 2 Microns | Fluid Loss |
|---|---|---|---|---|---|---|
| Crushed Limestone | 89.0 | 78.5 | 74 | 45 | 5 | 11.0 |
| Oyster Shell Flour | 92.5 | 90 | 85.5 | 49 | 5 | 12.0 |
| Barium Sulfate | 83 | 73 | 66.0 | 8 | 2 | 21.0 |
| Lime | 100 | 96 | 94 | 74.6 | 12 | 40.5 |

To illustrate the amount of primary plugging agent below 10 microns required to provide fluid loss control with a secondary plugging agent meeting the specifications of the present composition, a quantity of oyster shell flour was progressively settled and separated in accordance with Stokes' law and diluted with kerosene to provide variable amounts of particles under 10 microns. The various concentrations were incorporated in kerosene with aluminum oleate as the secondary plugging agent, and the fluid loss tests were run as described above, except that the mixing was performed by use of a slow-speed mixing device to eliminate the possibility of breaking down larger particles. It will be observed that, when a minimum of 0.0004 pound of solid particles below 10 microns are present, acceptable fluid loss control is obtained.

TABLE II

| Sample | Concentration of Aluminum Oleate, Lbs./Gal. | Concentration of Particles Under 10 Microns, Lbs./Gal. | Total Conc. of Solid Particles | Fluid Loss at 125° F. and 1,000 p.s.i.g. |
|---|---|---|---|---|
| 1 | 0.05 | 0.004 | 0.05 | 20 |
| 2 | 0.05 | 0.0004 | 0.05 | 40 |
| 3 | 0.05 | 0.00004 | 0.05 | 129 |
| 4 | 0.05 | 0.000004 | 0.05 | Infinite |

The following examples illustrate the effectiveness of the secondary plugging agents described above when used in combination with a primary plugging agent of the required particle size. Each fluid loss test was run in accordance with the above-described recommended API test, using either 0.05 or 0.1 pound of additive per gallon of oil.

TABLE III

| Dispersing Agent | Primary Plugging Agent | Secondary Plugging Agent | Oil Carrier | Fluid Loss |
|---|---|---|---|---|
| None | Barium sulfate (50%) | Aluminum oleate (50%) | Kerosene | 21 |
| Do | Lime (50%) | Calcium tallate (50%) | McElroy crude | 30 |
| Do | Coal dust (50%) | Aluminum tallate (50%) | Kerosene | 19.5 |
| Do | Lime (40%) and CaCl₂, NaCl and Na₂CO₃ (20%). | Sodium tallate (10%) and Calcium tallate (30%). | Hunton limestone crude. | 12 |
| Do | Same as above | Same as above | South Ponca crude. | 8.0 |
| PDB 30% | Sodium sulfate (60%) | Pliolite (10%) | Kerosene | 11.6 |
| Ethylene Diamine (20%). | Oyster shell flour (40%) | Pliolite (40%) | ____do____ | 32 |
| None | Barium sulfate (50%) | Aluminum stearate (50%) | ____do____ | 31 |

It will be noted in Table III that each of the secondary plugging agents used comes within the above definition; and since a fluid loss of 50 cc. in 30 minutes, when the test is run in accordance with the above-described procedure, is considered quite acceptable, each of the secondary plugging agents comes within the prescribed specifications. On the other hand, an API fluid-loss test using a metal soap wherein the allegedly secondary plugging agent comprises a soap prepared by using a fatty acid of less than 14 carbon atoms (aluminum laurate) and oyster shell flour of the required fineness in kerosene gave an infinite fluid loss which is, of course, unacceptable. Also, a test run using only a monovalent metal soap (sodium oleate), barium sulfate, and calcium gave a fluid loss of 75 cc. in 30 minutes, which is ordinarily considered unacceptable. In each of the last two-mentioned tests, the total additive used was 0.1 pound per gallon of calcium, with each of the primary and secondary plugging agents being 50% of the total additive. Although we do not wish to be limited to any theory of operation, we believe that the primary and secondary plugging agents co-operate in either or both of two ways in forming a substantial fluid impervious seal over a sub-surface formation. With some types of secondary plugging agents, such as the plastic fines and rubber fines, we believe the secondary plugging agent is deformed into and seals off the interstices in a layer of solid particles comprising the primary plugging agent. With other types of secondary plugging agents, such as metal soaps having the recommended strengths, the secondary plugging agent forms a soft and pliable coating around the individual solid particles to provide an effective seal when the coated particles are forced against the face of a sub-surface formation.

From the foregoing, it will be apparent that the present invention provides an economical fracturing fluid. Both the primary and secondary plugging agents are readily available from a large number of sources of supply, as well as being economical. Also, each of the components of an additive formed in accordance with the present invention may be obtained in dry form to permit a dry blending of the additive, which is simple to perform and materially reduces the over-all cost of a fracturing operation. Furthermore, the extremely small amounts of primary and secondary plugging agents required to obtain a good fluid loss do not materially increase the viscosity of the oil carrier, such that the basic fracturing fluid will have a relatively low viscosity which may be increased as desired by the user of the fluid.

Changes may be made in the combination, arrangement, and proportions of components, as well as the steps and procedures as heretofore set forth in the specification without departing from the spirit and scope of the invention as defined in the following claims:

We claim:

1. A low fluid loss additive for a fracturing oil consisting essentially of a primary plugging agent of finely divided oil-insoluble solid particles in an amount from 30 to 70 percent by weight of said additive with at least about 0.20 percent of said particles having a particle size less than about 10 microns, said particles being physically and chemically inert in oil; and a secondary plugging agent having a substantially water-insoluble, soft and pliable structure upon dispersion in oil capable of sealing interstices between said primary agent particles, said secondary agent, in an amount from 70 to 30 percent by weight of said additive, being selected from the group consisting of montan wax, asbestos fines, plastic fines, cellulose fines, rubber fines, and metal soaps of fatty acids having at least 14 carbon atoms, a major portion of the metal of said soaps being polyvalent; and containing an oil-soluble dispersing agent in an amount sufficient to disperse said plugging agents in oil.

2. An additive as defined in claim 1, wherein said "secondary plugging agent" is short fiber asbestos.

3. An additive as defined in claim 1, wherein said "secondary plugging agent" is rubber fines.

4. An additive as defined in claim 30 wherein said "secondary plugging agent" is a polyvalent metal soap of a fatty acid having at least 14 carbon atoms per molecule.

5. An additive as defined in claim 30 wherein said "secondary plugging agent" is an aluminum soap of a fatty acid having at least 14 carbon atoms per molecule.

6. An additive as defined in claim 1, wherein said "secondary plugging agent" is a mixture of polyvalent metal soaps of fatty acids having at least 14 carbon atoms per molecule.

7. An additive as defined in claim 30, wherein said "secondary plugging agent" is a mixture of monovalent metal soap and a major portion of polyvalent metal soaps of fatty acids.

8. An additive as defined in claim 7, wherein said soaps are sodium tallate and a major portion of calcium tallate.

9. A low fluid loss fracturing composition consisting essentially of a major portion of petroleum oil having dispersed therein an additive consisting essentially of a primary plugging agent of finely divided oil-insoluble solid particles in an amount from 30 to 70 percent by weight of said additive with at least about 0.20 percent of said particles having a particle size less than about 10 microns, said particles being physically and chemically inert in oil; and a secondary plugging agent having a substantially water-insoluble, soft and pliable structure upon dispersion in oil capable of sealing interstices between said primary agent particles about 10 microns in size, said secondary agent in an amount from 70 to 30 percent by weight of said additive, being selected from the group consisting of montan wax, asbestos fines, plastic fines, cellulose fines, rubber fines, and metal soaps of fatty acids having at least 14 carbon atoms, a major portion of the metal of said soaps being polyvalent.

10. A composition as defined in claim 9, wherein said "secondary plugging agent" is montan wax.

11. A composition as defined in claim 9, wherein said "secondary plugging agent" is rubber fines.

12. A composition as defined in claim 9, wherein said "secondary plugging agent" is a polyvalent metal soap of a fatty acid having at least 14 carbon atoms per molecule.

13. A composition as defined in claim 9, wherein said "secondary plugging agent" is an aluminum soap of a fatty acid having at least 14 carbon atoms per molecule.

14. A composition as defined in claim 9, wherein said "secondary plugging agent" is short fiber asbestos.

15. A composition as defined in claim 9, wherein said "secondary plugging agent" is a mixture of polyvalent metal soaps of fatty acids having at least 14 carbon atoms per molecule.

16. A composition as defined in claim 9, wherein said "secondary plugging agent" is a mixture of monovalent metal soap and a major portion of polyvalent metal soaps of fatty acids.

17. A composition as defined in claim 16, wherein said soaps are sodium tallate and a major portion of calcium tallate.

18. A low fluid loss fracturing composition consisting essentially of a major portion of petroleum oil having dispersed therein a primary plugging agent of finely divided oil-insoluble solid particles wherein at least 0.0004 pound of said particles per gallon of said oil is less than about 10 microns in size, said particles being physically and chemically inert in oil; and a secondary plugging agent having a substantially water-insoluble, soft and pliable structure upon dispersion in oil capable of sealing interstices between said primary agent particles about 10 microns in size, said secondary agent in an amount sufficient to reduce the fluid loss of said composition to less than 50 cc. in 30 minutes when tested at 125° F. and at a pressure of 1000 p.s.i.g. in accordance with the recommended API test for fracturing fluids using additives, being selected from the group consisting of montan waxes, asbestos fines, plastic fines, cellulose fines, rubber fines and metal soaps of fatty acids having at least 14 carbon atoms, a major portion of the metal of said soaps being polyvalent.

19. A low fluid loss fracturing composition consisting essentially of a major portion of petroleum oil having dispersed therein a primary plugging agent of finely divided oil-insoluble solid particles in an amount not more than about 0.2 pound per gallon of said oil wherein at least 0.0004 pound of said particles per gallon of said oil is less than about 10 microns in size, said particles being physically and chemically inert in oil; and a secondary plugging agent having a substantially water-insoluble, soft and pliable structure upon dispersion in oil capable of sealing interstices between said primary agent particles about 10 microns in size, said secondary agent in an amount sufficient to reduce the fluid loss of said composition to less than 50 cc. in 30 minutes when tested at 125° F. and at a pressure of 1000 p.s.i.g. in accordance with the recommended API test for fracturing fluids using additives, being selected from the group consisting of montan waxes, asbestos fines, plastic fines, cellulose fines, rubber fines and metal soaps of fatty acids having at least 14 carbon atoms, a major portion of the metal of said soaps being polyvalent.

20. In a process of fracturing a subterranean formation traversed by a well bore wherein petroleum oil is forced into the well bore under pressure, the method of sealing said formation against loss of appreciable amounts of said oil comprising dispersing in said oil a sufficient amount of an additvie consisting essentially of a primary plugging agent of finely divided oil-insoluble solid particles in an amount from 30 to 70 percent by weight of said additive with at least about 0.20 percent of said particles having a particle size less than about 10 microns, said particles being physically and chemically inert in oil; and a secondary plugging agent having a substantially water-insoluble, soft and pliable structure upon dispersion in oil capable of sealing interstices between said primary agent particles about 10 microns in size, said secondary plugging agent in an amount from 70 to 30 percent by weight of said additive, being selected from the group consisting of montan wax, asbestos fines, plastic fines, cellulose fines, rubber fines, and metal soaps of fatty acids having at least 14 carbon atoms, a major portion of the metal of said soaps being polyvalent, to reduce fluid loss of the resulting composition to less than 50 cc. in 30 minutes when tested at 125° F. and at a pressure of 1000 p.s.i.g. and contacting the face of said formation exposed to the well bore with said oil having said additive incorporated therein.

21. A process as defined in claim 20, wherein said "secondary plugging agent" is short fiber asbestos.

22. A process as defined in claim 20, wherein said "secondary plugging agent" is rubber fines.

23. A process as defined in claim 20, wherein said "secondary plugging agent" is montan wax.

24. A process as defined in claim 20, wherein said "secondary plugging agent" is a mixture of monovalent metal soap and a major portion of polyvalent metal soaps of fatty acids having at least 14 carbon atoms per molecule.

25. A process as defined in claim 24, wherein said soaps are sodium tallate and a major portion of calcium tallate.

26. A process as defined in claim 20, wherein said "secondary plugging agent" is a polyvalent metal soap of a fatty acid having at least 14 carbon atoms per molecule.

27. A process as defined in claim 26, wherein said soap is aluminum tallate.

28. In a process of fracturing a subterranean formation traversed by a well bore wherein petroleum oil is forced into the well bore under pressure, the method of sealing said formation against loss of appreciable amounts of said oil comprising dispersing in said oil a sufficient amount of an additive consisting essentially of a primary plugging agent of finely divided oil-insoluble solid particles wherein at least 0.0004 pound of said particles per gallon of said oil is less than about 10 microns in size, said particles being physically and chemically inert in oil; and a secondary plugging agent having a substantially water-insoluble, soft and pliable structure upon dispersion in oil capable of sealing interstices between said primary agent particles about 10 microns in size, said secondary agent being selected from the group consisting of montan waxes, asbestos fines, plastic fines, cellulose fines, rubber fines, and metal soaps of fatty acids having at least 14 carbon atoms, a major portion of the metal of said soaps being polyvalent, to reduce fluid loss of the resulting composition to less than 50 cc. in 30 minutes when tested at 125° F. and at a pressure of 1000 p.s.i.g., and contacting the face of said formation exposed to the well bore with said oil having said additive incorporated therein.

29. In a process of fracturing a subterranean formation traversed by a well bore wherein petroleum oil is forced into the well bore under pressure, the method of sealing said formation against loss of appreciable amounts of said oil comprising dispersing in said oil a sufficient amount of an additive consisting essentially of a primary plugging agent of finely divided oil-insoluble solid particles in an amount not more than about 0.2 pound per gallon of said oil wherein at least 0.0004 pound of said particles per gallon of said oil is less than about 10 microns in size, said particles being physically and chemically inert in oil; and a secondary plugging agent having a substantially water-insoluble, soft and pliable structure upon dispersion in oil capable of sealing interstices between said primary agent particles about 10 microns in size, said secondary agent being selected from the group consisting of montan waxes, asbestos fines, plastic fines, cellulose fines, rubber fines and metal soaps of fatty acids having at least 14 carbon atoms, a major portion of the metal of said soaps being polyvalent, to reduce fluid loss of the resulting composition to less than 50 cc. in 30 minutes when tested at 125° F. and at a pressure of 1000 p.s.i.g., and contacting the face of said formation exposed to the well bore with said oil having said additive incorporated therein.

30. A low fluid loss additive for a fracturing oil consisting essentially of a primary plugging agent of finely divided oil-insoluble solid particles in an amount from 30 to 70 percent by weight of said additive with at least about 0.20 percent of said particles having a particle size less than about 10 microns, said particles being physically and chemically inert in oil; and a secondary plugging agent of substantially water-insoluble metal soaps of fatty acids having at least 14 carbon atoms, a major portion of the metal of said soaps being polyvalent, in an amount from 70 to 30 percent by weight of said additive.

References Cited in the file of this patent

UNITED STATES PATENTS

| | | |
|---|---|---|
| 2,675,354 | McChrystal et al. | Apr. 13, 1954 |
| 2,779,735 | Brown et al. | Jan. 29, 1957 |
| 2,793,996 | Lummus | May 28, 1957 |
| 2,801,218 | Menaul | July 30, 1957 |
| 2,801,967 | Wilson | Aug. 6, 1957 |
| 2,811,207 | Clark | Oct. 29, 1957 |
| 2,830,948 | Popham | Apr. 15, 1958 |
| 2,995,514 | Jordan et al. | Aug. 8, 1961 |